Patented Mar. 14, 1939

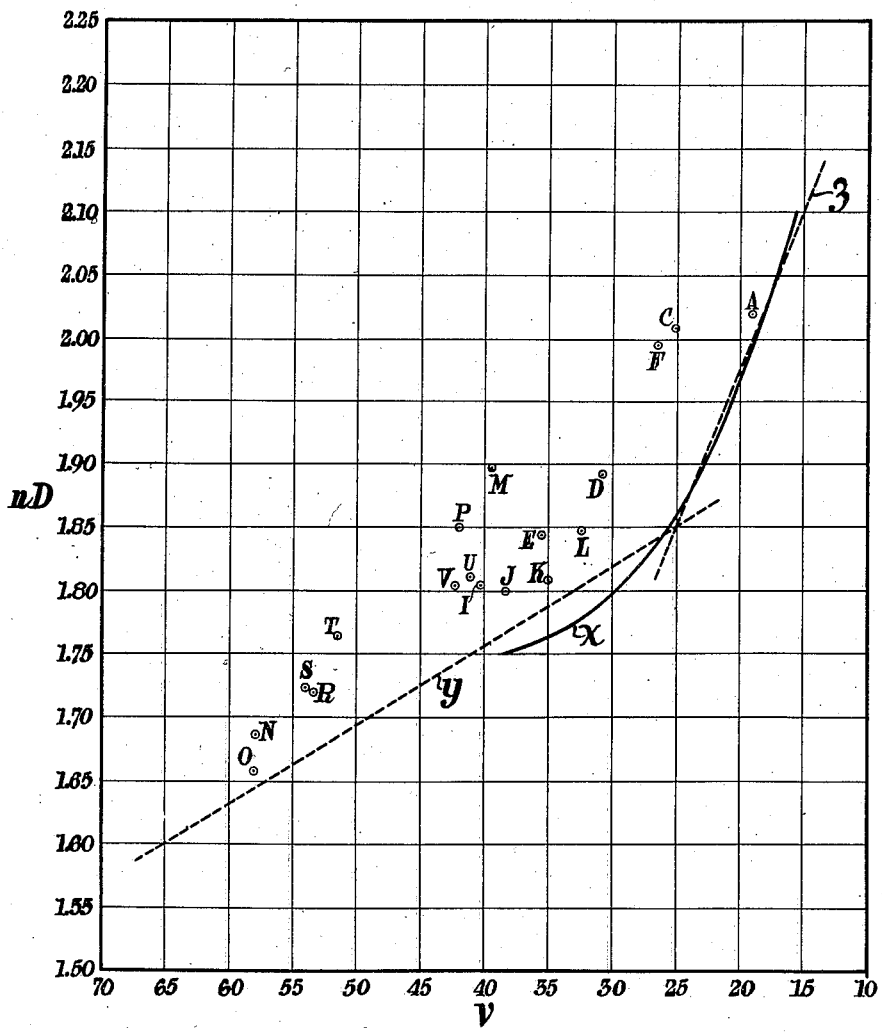

2,150,694

UNITED STATES PATENT OFFICE 2,150,694

OPTICAL GLASS

George W. Morey, Chevy Chase, Md., assignor, by mesne assignments, to Eastman Kodak Company, Jersey City, N. J., a corporation of New Jersey Application August 19, 1936, Serial No. 96,844
In Great Britain September 3, 1935

REISSUED

15 Claims. (Cl. 106—36.1)

The present invention relates to glasses and to batches from which they are made and, more particularly, to optical glasses having unique and highly desirable properties.

At the present time, the available optical glasses possessing suitable physical properties are primarily silicate glasses with a definitely limited range of optical properties. This is especially true of glasses having an index of refraction greater than 1.65 and places a limit upon the optical performance which may be secured by the lens designer. In these glasses, having a refractive index greater than 1.65 the dispersion is a definite function of the index and it is difficult, if not impossible, to attain with these glasses the degree of correction required for certain exacting lens systems.

It is an object of this invention to provide new glasses having high refractive indices and possessing relations between refractivity and dispersion different from those of previously known glasses; and which are of great chemical stability, notably fluid when molten so that they readily rid themselves of all bubbles, hard enough to withstand mechanical abrasion and scratching, capable of taking a high polish, resistant to weather and conditions of use for a prolonged period, and composed of ingredients which are essentially non-volatile and stable at temperatures necessary in making glass.

Further objects and advantages of this invention will appear from the following description when read in connection with the accompanying drawing, the single figure of which is a diagram showing the points obtained by plotting the dispersive ratios $\sqrt{}$ of a number of glasses against their refractive indices for the D line ($nD$).

In this figure, the points corresponding to the new glasses here diselosed are designated by capital letters, corresponding to the formulae hereinafter given. The curve $x$ represents the formula $$\sqrt{} = 38 - 38\sqrt{nD - 1.75}$$

and it is to be noted that the value of the dispersive ratio, $\sqrt{}$, is in most instances greater than this. These optical properties are of utility in the designing of objectives, and optical systems and apparatus.

It is further to be noted that, in every instance, the values of $\sqrt{}$ and of $nD$ are greater than the lines $y$ and $z$. The line $y$ is drawn through the points ($\sqrt{}=65$, $nD=1.65$) and ($\sqrt{}=25$, $nD=1.85$) and is defined by the equation $$\sqrt{} + 200nD = 385$$

The line $z$ is drawn through the second of the above defined points and point ($\sqrt{}=15$, $nD=210$) and is defined by the equation $$\sqrt{} + 4nD = 99$$

These newly discovered glasses are inorganic, non-silicate, amorphous substances, transparent within a useful range and formed by fusion of certain oxides herein after more definitely specified.

When used in the claims the word "glass" means an inorganic amorphous mass; and the word "transparent" means capable of transmitting useful light without diffusion except that due to refraction. Claims specifying a "glass batch" are intended to include the elements originally added, whatever may be their proportion or condition in the resultant glass.

From earliest times silica has been one of the chief ingredients of glass and optical glass at present contains a substantial percentage of silica. The principal exceptions to this statement are certain glasses formerly manufactured, high in boric oxide and/or phosphoric oxide, whose manufacture has been discontinued because of their low chemical stability. These glasses, the compositions of which were entirely different from those herein disclosed, did not have very high indices and were not particularly useful to the lens designer. It is generally accepted that glass is a mixture rather than a compound, and, although its composition is well known, practically nothing is known about its constitution.

In attempting to obtain a glass of unique optical properties and especially a glass having a refractive index greater than 1.65 and a unique dispersion, i. e., one which does not follow the flint glass trend, it seemed reasonable to expect that its composition should be built around the acid forming elements having relatively high atomic weights rather than silicon whose atomic weight is less than 30. I have found by long experiment that such a glass may indeed be made using the oxides of certain elements, particularly certain of those in the even series, and especially the eighth, in Groups III, IV, V and VI of the periodic table having atomic weights greater than 47. Judicious choice of these elements will result in a composition which is capable of making a glass of high refractive index having a dispersion which is considerably lower than that of available glasses having the same refractive index.

Some of the oxides of the elements having atomic weights greater than 47 in the series and in groups mentioned exclude themselves from practical use for various reasons, particularly their undesirable color absorption, their present rarity or difficulty in obtaining them in commercial quantities or in purified form. However, I do not intend to exclude from my invention glasses whose color absorptions do not detract from their usefulness in certain optical systems. All of the elements in the series mentioned which I have tried have, in certain combinations, formed glasses. Certain of these elements have more than one oxide and in such cases is meant only that oxide having the formula characteristic of the group, namely $X^2O^3$ for the third group, $XO^2$ for the fourth group, $X^2O^5$ for the fifth group and $XO^3$ for the sixth group. Those elements, the oxides of which when fused yield opaque or undesirably colored components are principally those having more than one oxide and it is possible that the color or opacity is due to the breaking down of the oxides and that if the pure oxide of characteristic formula could be obtained and fused without deterioration, it might yield a usable glass.

In general the materials comprising the formula are carefully weighed, screened, well mixed and melted at a temperature sufficient to melt all the ingredients, usually about 2000 to 2500° F. When they are thoroughly melted and mixed, the batch is poured into a container heated to the region of 1000° F. and placed in an annealing oven at a temperature of from 1300 to 1500° F. and slowly cooled, although all of these temperatures are variable with the composition of the glass. Because of the high fluidity, the batch may be well mixed by stirring or by pouring back and forth between two crucibles.

The elements which I have found especially useful are those in the eighth series and especially lanthanum and tantalum, and these two in combination with other oxides, such as titanium, thorium, zirconium and tungsten, seem to be especially useful. The chemical composition of the glass resulting from the formulae hereinafter given cannot now be stated with certainty, but the advantages of using the ingredients given and the improved properties of glass are very pronounced, whatever may be the actual constitution of the glass. It is very possible that the noted disadvantages of certain of the oxides may be partially or completely overcome.

It has been found that tantalum oxide alone makes a very satisfactory glass, but it is to be noted, as hereinafter stated, the tantalum oxide which is commercially available is impure and generally contains columbium oxide and that the glass referred to as satisfactory was made from tantalum oxide containing some columbium oxide. Examples of mixtures which have given good results are the following, parts being given by weight. It is to be understood that in each case the oxide is used unless otherwise specifically stated:

*Example A.*—Equal parts by weight of titanium and tantalum oxides

| Examples | B | C | D | E | F |
|---|---|---|---|---|---|
| Lanthanum | | 42 | 51 | 60 | 50 |
| Zirconium | 15 | 6 | 11 | 8.5 | 10 |
| Titanium | 40 | 12 | 13 | 17 | 12 |
| Tantalum | 45 | 28 | | | |
| Tungsten | | | 15 | | 14 |
| Boron | | 12 | 10 | 12.5 | 14 |
| Sodium | | | | 2 | |

| Examples | G | H |
|---|---|---|
| Titanium | 20 | |
| Zirconium | 20 | |
| Tantalum | 30 | 50 |
| Silicon | 30 | 50 |

| Examples | I | J | K | M | P | Q | R |
|---|---|---|---|---|---|---|---|
| Lanthanum | 26.3 | 27.2 | 49.2 | 37.5 | 36 | 26.7 | 22.2 |
| Tantalum | 26.3 | 27.2 | 23 | 29.2 | 28 | 26.7 | 22.2 |
| Thorium | 20.2 | 18.5 | 9.8 | 16.7 | 16 | 26.7 | 22.2 |
| Zirconium | | | 4.9 | | | | |
| Boron | 22.7 | 22.6 | 9.8 | 16.6 | 20 | 19.9 | 33.4 |
| Borax | 4.5 | 4.5 | 3.3 | | | | |

| Example | L |
|---|---|
| Lanthanum | 60 |
| Zirconium | 8.5 |
| Titanium | 17 |
| Boron | 12.5 |
| Borax | 2 |

| Examples | N | O |
|---|---|---|
| Lanthanum | 20 | 20 |
| Barium | 20 | 20 |
| Thorium | 20 | |
| Strontium | | 20 |
| Boron | 40 | 40 |

| Examples | S | T |
|---|---|---|
| Lanthanum | 60 | 33 |
| Thorium | | 41 |
| Boron | 40 | 26 |

| Examples | U | V |
|---|---|---|
| Lanthanum | 28 | 28 |
| Thorium | 14 | 14 |
| Tantalum | 28 | 28 |
| Boron | 22 | 20 |
| Lithium nitrate | 8 | 10 |

The batches, whose compositions are given above, produce excellent optical glasses having extremely high indices of refraction and much lower dispersions than do glasses of the flint series; Examples I and K being notably clear. These glasses are shown in the accompanying drawing from which their unique optical characteristics are readily apparent. The numerical values of the refractive indices of some of these glasses and their dispersive indices used in determining their position in the drawing are listed below, the dispersive index ($\sqrt{}$) having the value $$\frac{nD-1}{nF-nC}$$

where $nD$, $nF$, $nC$ and $nG$ are the refractive indices of the D, F, C and G lines respectively:

| Example | nC | nD | nF | nG | ν |
|---|---|---|---|---|---|
| A | 2.008 | 2.022 | 2.061 | 2.097 | 19.1 |
| C | 1.996 | 2.008 | 2.036 | 2.063 | 25.2 |
| D |  | 1.893 |  |  | 30.8 |
| E | 1.835 | 1.842 | 1.858 | 1.873 | 35.5 |
| F | 1.984 | 1.995 | 2.021 | 2.044 | 26.6 |
| G |  | 1.8107 |  |  |  |
| I | 1.798 | 1.805 | 1.818 |  | 40.3 |
| J | 1.795 | 1.800 | 1.816 |  | 38.4 |
| K | 1.801 | 1.809 | 1.825 |  | 35 |
| L |  | 1.848 |  |  | 32.5 |
| M |  | 1.898 |  |  | 39.6 |
| N | 1.6820 | 1.6861 | 1.6839 |  | 58.0 |
| O | 1.6545 | 1.6576 | 1.6658 |  | 58.1 |
| P |  | 1.85 |  |  | 42 |
| R | 1.7132 | 1.7175 | 1.7266 | 1.7360 | 53.5 |
| S | 1.7179 | 1.7227 | 1.7313 | 1.7392 | 54.1 |
| T | 1.7624 | 1.7667 | 1.7773 | 1.7856 | 51.4 |
| U | 1.8060 | 1.8119 | 1.8258 |  | 41.15 |
| V | 1.7985 | 1.8037 | 1.8175 | 1.8288 | 42.38 |

I wish to point out, however, that, while I consider all the formulae given above to be included within the scope of my invention as broadly stated in this specification and covered in the claims appended hereto, certain of the formulae given are, so far as the specific combinations and proportions are concerned, the work of Leon W. Eberlin, in whose name applications covering them are being filed; and they are given here as illustrative of the scope of my invention.

Inasmuch as a number of the oxides, used in making my improved glasses, can be obtained in their pure form only with the greatest of difficulty, it may be well to mention that the tantalum oxide need not be completely free of columbium, and the small amount of hafnium, which is usually present in small quantities in all commercial zirconium, does not appear to have any harmful effect.

In general and particularly in formulae B to G inclusive, the lanthanum oxide may be replaced in whole or in part by yttrium oxide and the zirconium oxide may be replaced with thorium oxide, and the latter substitution is especially suggested in formula C.

As instances in some of the formulae, it may be desirable or necessary to add a glassifier or fluxing agent such as boric oxide or borax, or other borates. It will be also understood that the batch compositions, given above, are not at all rigid and that various ingredients, such as small amounts of lithium or sodium oxide, may be used without departing from the invention. In some cases, it may be desirable to include the oxide of either rubidium or cesium, since these glasses may be referred to roughly as being acid types of glass.

Although a number of the rare earths which are very expensive and difficult to obtain have not been tested for their glass forming properties, all of the more readily obtainable elements of the even series in Groups III, IV, V and VI, of the periodic table having atomic weights greater than 47 have been tried and they have been found to be well suited to the making of high quality glass. Although it is true that certain of them, such as vanadium, uranium and cerium, impart some color in the glass, this color is not necessarily disadvantageous for all uses.

Although the preferred examples of these new glasses contain no silicate I consider as within the scope of my invention all glasses which, even though they may contain silicates and other compounds, contain a considerable proportion of the oxides above pointed out and have the characteristic properties attributable to these oxides, and two examples are given, which include a considerable proportion of silica. In general, however, I do not propose to use silica to an extent approaching 25% of the total, and prefer it to be less than 10%.

As is evident from the formulae and specification the oxides which I have found most useful are those of titanium, zirconium, lanthanum, tantalum, thorium and tungsten and to a less extent yttrium, columbium and hafnium, and the glasses having a high proportion of these have refractive and dispersive values greater than the curve $x$ on the chart. The properties of these glasses now seem to be of the greatest value for optical instruments. However, a small proportion of these materials, as in Examples N and O, give glasses having new properties attributable to the presence of these materials, and all glasses, particularly non silicate glasses, having these oxides in sufficient amounts and proportions to yield glasses having these distinguishing properties I consider as within the scope of my invention.

Having thus described my invention, what I claim as new and desire to secure by Letters Patent is:

1. A transparent optical glass having an index of refraction ($nD$) for the D-line greater than 1.65 and a dispersive index greater than both 385—200 $nD$ and 99—4 $nD$, resulting from fusion of a glass batch containing less than 10% silica and containing at least 20% by weight of oxides selected from the group consisting of the following elements: titanium, yttrium, zirconium, columbium, lanthanum, hafnium, tantalum, tungsten and thorium.

2. A non-silicate transparent optical glass having an index of refraction ($nD$) for the D-line greater than 1.65 and a dispersive index greater than both 385—200 $nD$ and 99—4 $nD$ resulting from fusion of a glass batch containing at least twenty percent by weight of oxides selected from the group consisting of the following elements: titanium, yttrium, zirconium, columbium, lanthanum, hafnium, tantalum, tungsten and thorium.

3. A non-silicate transparent optical glass having both an index of refraction ($nD$) for the D-line and a dispersive index ($\sqrt{\ }$) greater than both $\sqrt{\ }=385$—200 $nD$ and $\sqrt{\ }=99$—4 $nD$ resulting from fusion of a glass batch containing at least twenty percent by weight of oxides selected from the group consisting of the following elements: titanium, yttrium, zirconium, columbium, lanthanum, hafnium, tantalum, tungsten and thorium.

4. A non-silicate transparent optical glass having both an index of refraction ($nD$) for the D-line and a dispersive index greater than $$\sqrt{\ }=38-38\sqrt{nD-1.75}$$

resulting from fusion of a glass batch containing at least twenty percent by weight of oxides selected from the group consisting of the following elements: titanium, yttrium, zirconium, columbium, lanthanum, hafnium, tantalum, tungsten and thorium.

5. A glass resulting from fusion of a glass batch containing the oxides of tantalum and lanthanum to a total of at least 40%, and having an index of refraction greater than 1.70.

6. A non silicate glass resulting from fusion of a glass batch containing the oxides of tantalum and lanthanum to a total of at least 40% of the total by weight.

7. A glass resulting from fusion of a glass batch containing the oxides of lanthanum, tantalum and thorium to an amount equal to at least 65% of the total by weight.

8. A glass resulting from fusion of a glass batch containing the oxides of lanthanum, tantalum and thorium to an amount equal to at least 65% of the total by weight and also containing boric oxides.

9. A glass resulting from fusion of a batch containing at least twenty per cent of weight of lanthanum oxide.

10. A glass resulting from fusion of a batch containing at least twenty percent by weight of tantalum oxide.

11. A glass batch containing at least fifty percent by weight of oxides selected from the group consisting of the following elements: titanium, zirconium, lanthanum, tantalum, tungsten and thorium.

12. A glass batch containing at least twenty percent by weight of oxides selected from the group consisting of the following elements: titanium, zirconium, lanthanum, tantalum, tungsten and thorium and containing not over twenty five percent of silica.

13. A glass batch containing at least forty percent by weight of the oxides of zirconium and lanthanum.

14. A method of manufacture of optical glasses having a refractive index greater than 1.65 which comprises fusing with suitable fluxes an oxide or oxides selected from the group consisting of the following elements: titanium, zirconium, lanthanum, tantalum, thorium, tungsten, yttrium, columbium and hafnium, the latter being present to a total amount equal to at least fifty percent by weight of the batch.

15. A method of manufacture of optical glasses having a refractive index greater than 1.65 which comprises fusing with suitable fluxes, and in the absence of silica, an oxide or oxides selected from the group consisting of the following elements: titanium, zirconium, lanthanum, tantalum, thorium, tungsten, yttrium, columbium and hafnium, the latter being present to a total amount equal to at least fifty percent by weight of the batch.

GEORGE W. MOREY.